Jan. 14, 1958 G. H. SCHOUTEN ET AL 2,820,089

RHYTHMIC TELEGRAPH SYSTEM

Filed Sept. 8, 1955

INVENTORS
GERRIT HILBERTUS SCHOUTEN
HENDRIK CORNELIS ANTHONY VAN DUUREN

BY

AGENT

United States Patent Office 2,820,089
Patented Jan. 14, 1958

2,820,089

RHYTHMIC TELEGRAPH SYSTEM

Gerrit Hilbertus Schouten, Hilversum, and Hendrik Cornelis Anthony Van Duuren, Wassenaar, Netherlands, assignors, by mesne assignments, to North American Philips Company, Inc., New York, N. Y., a corporation of Delaware Application September 8, 1955, Serial No. 533,182

4 Claims. (Cl. 178—2)

In telegraph systems, in which the telegraph signals each comprise a fixed number of elements, the first (start element) and the last (stop element) of which normally have fixed but opposite polarities, there is often a need for the possibility of transmitting a service signal in order to safeguard telecommunication. This is, for example, the case in full duplex-communication where it may, for example, be desired to indicate, at the transmitter end of one channel, that the receiver end is ready to receive a message or that the stop signal has been detected. In this case, the service signal must be sent over the other oppositely directed channel.

The present invention provides a device which, in rhythmic telegraph systems, that is to say systems in which the telegraph signals are transmitted in direct succession, permits a service signal to be transmitted through a channel through which a message is simultaneously transmitted, without troubling or delaying the transmission of said message.

The device in accordance with the invention is characterized in that means for reversing the polarity of a start element and/or a stop element are provided at the transmitter end and means responding to the reception of a start element and/or a stop element, the polarity of which is opposite to the normal polarity, are provided at the receiver end.

Figure 1:
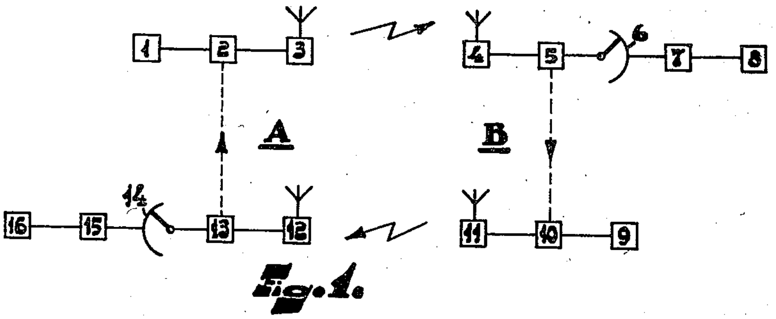
Figure 2:
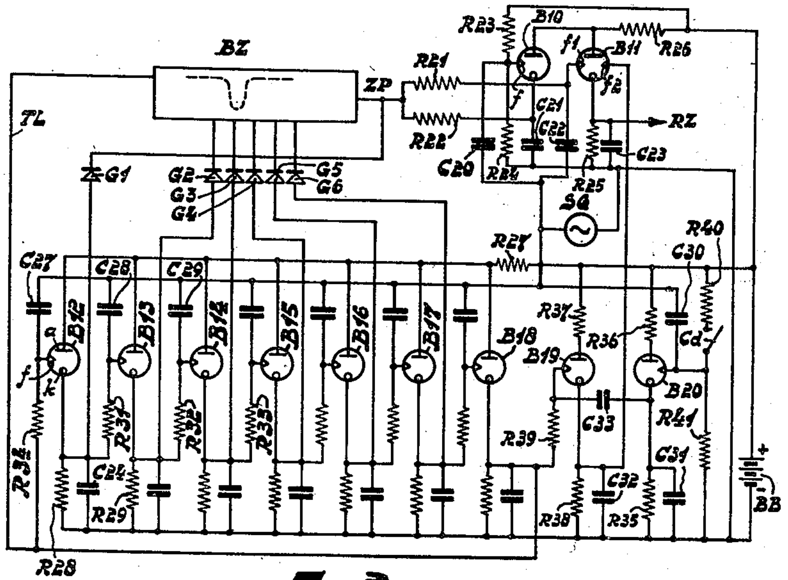
Figure 3:
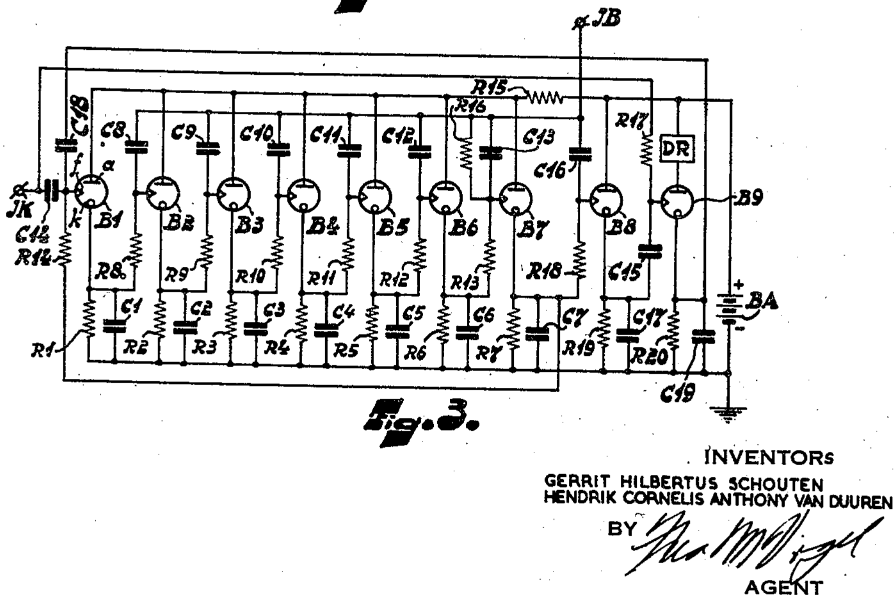

In order that the invention may be readily carried into effect it will now be described with reference to the accompanying drawing, given by way of example, in which Fig. 1 shows diagrammatically one form of a radio duplex communication between two stations A and B, Fig. 2 shows a part of a telegraph transmitter, and Fig. 3 shows a part of a receiver for detecting service signals.

In the duplex system shown in Fig. 1, a message is transmitted from station A to station B by means of a tape transmitter 1, where the telegram is recorded, a telegraph transmitter 2, a radiotransmitter 3, a radioreceiver 4, a rhythmic telegraph receiver 5, a selector 6, a reception distributor 7 and a reperforator 8 by which the telegram is recorded. Independently of the first message, a telegram can simultaneously be transmitted from station B to station A, through a tape transmitter 9, a rhythmic telegraph transmitter 10, a radiotransmitter 11, a radioreceiver 12, a rhythmic telegraph receiver 13, a selector 14, a reception distributor 15 and a reperforator 16. If a telegram is to be transmitted from station A to station B, the station A transmits a calling signal to station B, where the channel concerned may either or not numerically be connected to a free reperforator 8 by means of a selector 6. As soon as this connection has been established, the rhythmic telegraph receiver 5 transmits a signal to the rhythmic telegraph transmitter 10 of the return channel to indicate that a service signal is to be transmitted. Station B continually transmits signals to station A, that is to say that station B transmits auxiliary signals if no messages are transmitted. All the signals, that is to say both the telegraph signals proper and the auxiliary signals, comprise seven elements, the first (start element) and the last (stop element) of which normally have fixed opposite polarities. For example, the start element is normally invariably positive and the stop element is normally invariably negative, regardless of the meaning of the signal which is determined by the five remaining elements.

In accordance with the invention, transmission of a service signal is effected by reversing the polarity of a start element and/or stop element. In the case under review, only the instance will be described, in which the polarity of a stop element is changed. It will be appreciated, however, that fundamentally either the polarity of the start signal or the polarities of both signals may be reversed. For example, the telegraph transmitter may be so arranged that the transmission contact, which is keyed in accordance with the signals to be transmitted and is invariably closed during a start element and open during a stop element, is shunted by the series-combination of a contact which is constantly closed during a stop element, and a contact which is closed if a service signal must be transmitted, which will be the case if the telegraph transmitter 10 receives the aforesaid signal from the telegraph receiver 5. Hence, instead of transmitting a negative stop element, a positive stop element will then have been transmitted on or more times.

One form of an electronic circuit-arrangement for the same purpose is shown in Fig. 2.

The telegraph signals to be transmitted are recorded in a punching tape of the tape transmitter BZ denoted by 1 in Fig. 1 and diagrammatically represented in Fig. 2. The transmission is controlled by a counting circuit which is of a type known per se and comprises gas-filled tubes $B_{12}$, $B_{13}$, $B_{14}$, $B_{15}$, $B_{16}$, $B_{17}$, $B_{18}$. The tubes each comprise a cathode $k$, and anode $a$ and an ignition electrode $f$, for example as shown for tube $B_{12}$. The anodes $a$ of said tubes are connected through a common resistor $R_{27}$ to the positive terminal of battery BB. The cathodes $k$ are connected through the parallel-combination of resistors $R_{28}$, $R_{29}$, $R_{30}$ and so on and capacitors $C_{24}$, $C_{25}$, $C_{26}$ and so on to the negative terminal of battery BB and are further connected through resistors $R_{31}$, $R_{32}$, $R_{33}$ and so on to the ignition electrode of the following tube of the counter circuit, the cathode of the last tube $B_{18}$ being coupled through resistor $R_{34}$ to the ignition electrode $f$ of the first tube $B_{12}$. Every 20 msec. the standard signal generator SG supplies a positive pulse to the ignition electrode of the several tubes of the counter circuit through capacitors $C_{27}$, $C_{28}$, $C_{29}$ and so on. During operation, only one tube of the counter circuit is conductive, for example tube $B_{13}$ at a given instant. As a result of the voltage drop across resistor $R_{29}$ the potential of the ignition electrode of the following tube $B_{14}$ is then higher than that of the ignition electrodes of the remaining tubes, so that the next pulse ignites tube $B_{14}$ with the result that tube $B_{13}$ is cut off due to the common resistor $R_{27}$ inserted in the anode circuit. In this manner a following tube of the counter circuit is ignited every 20 msec.

The several tubes control the transmission of the elements of a telegraph signal.

The first tube $B_{12}$ controls the first element, the start element, which invariably has positive polarity, whilst the tubes $B_{13}$, $B_{14}$, $B_{15}$, $B_{16}$, $B_{17}$ control the succeeding five elements constituting the telegraph signal proper and the polarity of which depends upon the presence or absence of a hole in the tape of tape transmitter BZ. The tube $B_{18}$ controls the last or stop element of the signal, which element normally has negative polarity but is positive if a service signal is transmitted. The cathode $k$ of tube $B_{12}$ is connected through rectifier $G_1$ to point ZP. The cathodes of tubes $B_{13}$, $B_{14}$, $B_{15}$, $B_{16}$, $B_{17}$ are connected through rectifiers $G_2$, $G_3$, $G_4$, $G_5$, $G_6$ to the tape transmitter BZ where they are connected to point ZP via contacts (not shown) which are controlled by test pins testing the signal punched into the tape. If tube $B_{12}$ is conductive the point ZP has a relatively high potential corresponding to the positive polarity which the start element must have. If tube $B_{13}$ is conductive the polarity of point ZP is relatively high when the corresponding contact of the tape transmitter BZ is closed, in which case a positive element will consequently be transmitted, or relatively low if said contact is open, in which case the element will be negative. Similarly, the next elements of the telegraph signal are controlled by tubes $B_{13}$, $B_{14}$, $B_{15}$, $B_{16}$, $B_{17}$ in accordance with the signal recorded in the tape. During the time period in which tube $B_{18}$ is conductive, the point ZP has a relatively low potential in accordance with the negative polarity which the stop element must normally have. When tube $B_{18}$ becomes conductive, the cathode of this tube transmits over line TL a pulse to the tape transmitter BZ to the effect of displacing the tape one step in a manner not further described, and the test pins test the next symbol. The telegraph signals thus appearing at point ZP are passed on through a trigger circuit comprising gas-filled tubes $B_{10}$, $B_{11}$ to the radio transmitter 3 shown in Fig. 1. The anodes of the tubes $B_{10}$, $B_{11}$ are connected through a common resistor $R_{26}$ to the positive terminal of battery BB. The cathode of tube $B_{10}$ is connected to the negative terminal of the battery, similarly to the cathode of tube $B_{11}$ via the parallel-combination of resistor $R_{25}$ and capacitor $C_{23}$. The ignition electrode $f_1$ of tube $B_{11}$ and the cathode of tube $B_{10}$ are each connected through a resistor $R_{21}$ and $R_{22}$ respectively to point ZP. Every 20 msec. the standard pulse generator SG supplies a positive pulse to the ignition electrode $f$ of tube $B_{10}$ and $f_1$ of tube $B_{11}$ through capacitors $C_{20}$ and $C_{22}$. If, at such instant, the point ZP has a relatively high potential, for example at the end of a time period, during which tube $B_{12}$ is conductive, such a voltage is set up between the ignition electrode $f_1$ and the cathode $k$ of tube $B_{11}$ as to render said tube conductive. The line RZ transmits a positive element from the cathode of tube $B_{11}$ to the radio transmitter. If point ZP has a relatively low potential during the time period, during which tube $B_{13}$ is conductive, the cathode of tube $B_{10}$ will equally have a low potential, so that upon the next impulse, which is supplied by way of capacitor $C_{20}$, such a voltage is set up between the ignition electrode $f$ of tube $B_{10}$, which electrode is suitably biased by means of a voltage divider $R_{23}$, $R_{24}$, and the cathode of tube $B_{10}$ as to ignite this tube. The tube $B_{11}$ is then cut off due to the common resistor $R_{26}$ in the anode circuits, hence the cathode of tube $B_{11}$ will transmit a negative element to the radio transmitter. Tube $B_{10}$ is cut off independently. If, in the time period, during which tube $B_{13}$ was conductive, the point ZP would have had a comparatively low potential, the tube $B_{11}$ would have remained conductive and would have transmitted a positive element to the radio transmitter. In this manner the trigger circuit transmits the telegraph signals, which appear at a point ZP, to the radio transmitter with a time delay of 20 msec. As has already been stated the last or stop element normally has a negative potential. During the time period, in which tube $B_{12}$ is conductive, said element is supplied via the line RZ to the radio transmitter, since tube $B_{11}$ was cut off at the end of the time period during which tube $B_{18}$ was conductive, during which last-mentioned period the point ZP has at any rate a relatively low potential.

If a service signal is to be transmitted, that is to say, that the polarity of the stop signal has to be reversed, the contact $Cd$ is closed by means not further described, as a result of which the ignition electrode of tube $B_{20}$ is relatively considerably biased by means of the voltage divider $R_{40}$, $R_{41}$. The anode of tube $B_{20}$ is connected through resistors $R_{36}$ to the positive terminal of battery BB, whilst the cathode is connected to the negative terminal via the parallel combination of resistor $R_{35}$ and capacitor $C_{31}$. Every 20 msec. the standard signal generator SG supplies a positive pulse to the ignition electrode of tube $B_{20}$ through capacitor $C_{30}$ with the result that this tube ignites and is subsequently cut off independently, since the resistor $R_{36}$ has a high value. As long as contact $Cd$ is closed, the capacitor $C_{33}$ passes on every 20 msec., a positive pulse to the ignition electrode of tube $B_{19}$. This ignition electrode is connected through resistor $R_{39}$ to the cathode of tube $B_{18}$ so that this electrode has a relatively high bias during the time period in which tube $B_{18}$ is conductive. At the end of this period, the tube $B_{19}$ ignites under the influence of the positive pulse supplied through the capacitor $C_{33}$, the cathode of tube $B_{19}$, which is connected to the ignition electrode $f_2$ of tube $B_{11}$, assuming such a potential as to ignite tube $B_{11}$. The tube $B_{19}$ is cut off independently. Although, in this case, tube $B_{10}$ also ignites, so that tube $B_{11}$ would normally be cut off again, the ignition electrode $f_2$ of tube $B_{11}$ retains a relatively high potential value for a sufficient time, so that tube $B_{11}$ is not cut off and transmits via line RZ a positive stop element to the radiotransmitter.

The reversal of polarity of the stop element is detected by the telegraph receiver 13, which is shown in Fig. 1, of station A, the telegraph receiver 13 then transmitting a signal to the telegraph transmitter 2 as an indication that the message can be transmitted. Similarly, a service signal can be transmitted, for example, at the end of the message, from station B to station A to indicate that the stop signal transmitted by station A has been received by station B and recognized as such.

The telegraph receiver 13 comprises a device shown in Fig. 3 for synchronizing the receiver with respect to the beginning and the end of the incoming signals and for detecting a service signal. The synchronisation device utilises the fact that the start- and stop-elements normally have fixed polarity, so that the change over from negative polarity to positive polarity, which occurs on separating a stop element and a start element at the beginning or at the end of the signals, occurs periodically, whereas said change over will not occur periodically on separating other elements of the telegraph signals, postulating that the same signal is not continually repeated.

To this end, the device comprises a counter circuit which is designed similarly to the counter circuit shown in Fig. 2 and comprises seven gas-filled tubes $B_1$, $B_2$, $B_3$, $B_4$, $B_5$, $B_6$, $B_7$ each having a cathode $k$, an anode $a$ and an ignition device $f$, for example as shown for tube $B_1$. The cathode leads of the tubes comprise resistors $R_1$, $R_2$, $R_3$, $R_4$, $R_5$, $R_6$, $R_7$ shunted by capacitors $C_1$, $C_2$, $C_3$, $C_4$, $C_5$, $C_6$ and $C_7$ respectively. The ignition electrodes of tubes $B_2$, $B_3$, $B_4$, $B_5$, $B_6$, $B_7$ are connected through resistors $R_8$, $R_9$, $R_{10}$, $R_{11}$, $R_{12}$, $R_{13}$ to the cathode of the preceding tube of the counter circuit, whilst the ignition electrodes of tube $B_1$ is connected through resistor $R_{14}$ to the cathode of tube $B_7$. Each time only one of said tubes is conductive. The anode circuits of the tubes comprise a common resistor $R_{15}$, so that, upon ignition of a tube, the tube then conductive is cut off. A source of impulses IB (not shown) which is synchronized with the incoming telegraph signals in a manner which is known per se and not further described, periodically supplies every 20 msec. via capacitors $C_8$, $C_9$, $C_{10}$, $C_{11}$, $C_{12}$, $C_{13}$ a positive pulse to the ignition electrodes of tubes $B_2$, $B_3$, $B_4$, $B_5$, $B_6$, $B_7$ at instants coinciding with the separation between the several elements of the telegraph signals. In the rest state of the counter circuit, tube $B_7$ is conductive since the ignition electrode $f_1$ of this tube is connected through resistors $R_{16}$, $R_{15}$ to the positive terminal of battery BA so that its bias exceeds those of the ignition electrodes of the remaining tubes. The incoming telegraph signals are supplied to the input terminal IK. Letting the counter circuit provisionally not be synchronized with the incoming signals. On account of the differentiating action of capacitor $C_{14}$ a positive pulse appears at the control electrode of tube $B_1$ on passing over from a negative to a positive element, whereas a negative pulse appears upon a change over in the opposite sense. Of said pulses only the positive pulses can be operative. The first positive pulse ignites the tube $B_1$, and the counter circuit now counts six pulses under the control of the pulse generator IB. The first pulse supplied by the pulse generator upon ignition of tube $B_1$ ignites tube $B_2$ since the ignition electrode of this tube now has the highest bias as a result of the fact that its ignition electrode is connected through resistor $R_8$ to the cathode of the conductive tube $B_1$. The tube $B_1$ is cut off simultaneously. Similarly the second pulse ignites tube $B_3$ and so forth until the sixth pulse makes tube $B_7$ conductive. If, during this time period, positive pulses would again have been supplied to the control electrode $f$ of tube $B_1$, said pulses remain inactive since tube $B_7$ is not conductive and the ignition electrode of tube $B_1$ consequently has a relatively low voltage. Let it first be assumed that the first positive pulse supplied to said ignition electrode does not coincide with the beginning of a telegraph signal but, for example, appears at the end of the third element of said signal. In this case the counter circuit has resumed its initial position at the end of the third element of the next signal. Should at this instant a change-over occur from negative to positive, the counting circuit would again count six pulses of the pulse generator IB. If, however, this is not the case the counter circuit remains in the rest state until such change-over reoccurs. After a short time the counter circuit will be in step with the telegraph signals and tube $B_1$ will be ignited upon a change-over which occurs on separating the stop and start elements, the ignition electrode of tube $B_1$ invariably being supplied with a positive pulse after seven elements so that the counter circuit constitutes counting uninterruptedly. The input terminal IK is further connected through resistor $R_{17}$ to the ignition electrode of tube $B_9$, the anode circuit of which comprises a winding of relay DR. The ignition electrode of tube $B_9$ is coupled through capacitor $C_{15}$ to the cathode of tube $B_8$, to the ignition electrode of which are equally supplied, through capacitor $C_{16}$, the pulses of the pulse generator IB. The ignition electrode of tube $B_8$ is connected through resistor $R_{18}$ to the cathode of tube $B_7$ so that tube $B_8$ is invariably ignited by the first pulse of generator IB upon tube $B_7$ becoming conductive, in other words normally invariably at instants coinciding with the separation between two telegraph signals. The cathode circuit of tube $B_8$ comprises a resistor $R_{19}$ which is shunted by capacitor $C_{17}$ and the value of which is such that the tube $B_8$ is invariably cut off independently. On receiving a service signal the polarity of the stop signal will have been reversed, so that the stop and start element have the same positive polarity. In this case the capacitor $C_{14}$ does not pass over a positive separating pulse to the ignition electrode $f$ of tube $B_1$. As has already been stated, however, the tube $B_8$ will ignite at the beginning of the start signal and the capacitor $C_{15}$ will transmit a positive pulse to the ignition electrode of tube $B_9$, so that this tube will ignite on account of the fact that its ignition electrode, which is connected through resistor $R_{17}$ to the input terminal IK, then has a high bias, since the stop element has been positive. Upon ignition of tube $B_9$ the capacitor $C_{18}$ transmits a positive pulse from the cathode of tube $B_9$ to the ignition electrode of tube $B_1$ so that the counting circuit continues counting uninterruptedly.

At the same time, the relay DR is energized as an indication that a service signal has been received, thereby initiating further switch operations not further referred to. The tube $B_9$ is again cut off independently, since the cathode resistor $R_{20}$ is now shunted by capacitor $C_{19}$ and has a considerable value.

What is claimed is:

1. A telegraph system comprising a transmitter for producing telegraph signals each of which is composed of a plurality of elements, the first and last of said elements normally having opposite electrical polarities thereby to function as a start element and a stop element, respectively, means for selectively reversing the polarity of at least one of said first and last elements, and receiver means for receiving said telegraph signals and adapted to respond to said elements having reversed polarity, whereby said elements having reversed polarity function to provide a service signal.

2. A system as claimed in claim 1, in which said polarity-reversing means is adapted to selectively reverse the polarity of only the first element of each telegraph signal.

3. A system as claimed in claim 1, in which said polarity-reversing means is adapted to selectively reverse the polarity of only the last element of each telegraph signal.

4. A system as claimed in claim 1, in which said polarity-reversing means is adapted to selectively reverse the polarities of both of said first and last elements of each telegraph signal.

References Cited in the file of this patent

UNITED STATES PATENTS

| | | |
|---|---|---|
| 1,564,421 | Kleinschmidt | Dec. 8, 1925 |
| 2,193,213 | Wetzler | Mar. 12, 1940 |
| 2,737,544 | Wright | Mar. 6, 1956 |